(12) United States Patent
Huang

(10) Patent No.: US 11,118,722 B2
(45) Date of Patent: Sep. 14, 2021

(54) QUICK RELEASE ASSEMBLY AND SUPPORT

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 45 days.

(21) Appl. No.: 16/784,209

(22) Filed: Feb. 6, 2020

(65) Prior Publication Data

US 2020/0393077 A1    Dec. 17, 2020

Related U.S. Application Data

(60) Provisional application No. 62/861,300, filed on Jun. 13, 2019.

(30) Foreign Application Priority Data

Nov. 11, 2019    (TW) .................................. 108214926

(51) Int. Cl.
*F16M 11/04*    (2006.01)
*A47B 97/00*    (2006.01)

(52) U.S. Cl.
CPC ........... *F16M 11/041* (2013.01); *A47B 97/00* (2013.01); *A47B 2097/005* (2013.01); *F16M 2200/066* (2013.01)

(58) Field of Classification Search
CPC ........... F16M 11/041; F16M 2200/066; A47B 2097/005

See application file for complete search history.

(56) References Cited

U.S. PATENT DOCUMENTS

| 7,317,613 | B2 * | 1/2008 | Quijano | F16M 11/041 16/323 |
| 7,499,272 | B2 * | 3/2009 | Searby | F16M 11/041 248/917 |
| 7,502,226 | B2 * | 3/2009 | Searby | F16M 11/041 361/679.41 |
| 7,669,820 | B2 * | 3/2010 | Tien | F16M 11/10 248/222.13 |
| 8,083,193 | B2 * | 12/2011 | Matsui | F16M 11/041 248/221.11 |

(Continued)

FOREIGN PATENT DOCUMENTS

| TW | I376060 | 11/2012 |
| TW | I376068 | 11/2012 |
| TW | I376069 | 11/2012 |

*Primary Examiner* — Bradley Duckworth
(74) *Attorney, Agent, or Firm* — JCIPRNET

(57) ABSTRACT

A quick release assembly for attaching a display screen having at least one set of mounting holes thereto and a support are provided. The quick release assembly includes a first and a second quick release units. The first quick release unit is disposed on the support and includes a first cover assembled to an engaging plate, a button partially exposed from an opening of the first cover, a driven-stop plate disposed between the first cover and the engaging plate, and an elastic member. The second quick release unit includes a joint plate having at least one aligning hole, at least one fixing hole, and at least one set of attachment holes, a second cover assembled to the joint plate and having a notch, and a plurality of fixing members correspondingly inserted into the attachment holes and the mounting holes respectively to secure the display screen to the joint plate.

25 Claims, 12 Drawing Sheets

(56) References Cited

U.S. PATENT DOCUMENTS

| | | | | |
|---|---|---|---|---|
| 8,733,716 B2* | 5/2014 | Li | ................... | G06F 1/1601 |
| | | | | 248/188 |
| 9,042,092 B2* | 5/2015 | Lu | ................... | F16M 11/041 |
| | | | | 361/679.29 |
| 9,338,902 B2* | 5/2016 | Liu | ................... | F16M 11/041 |
| 10,309,578 B2* | 6/2019 | Yen | ................... | F16M 13/022 |
| 10,659,719 B2* | 5/2020 | Huang | ................ | F16M 11/041 |
| 10,809,761 B1* | 10/2020 | Lin | ................... | G06F 1/1601 |
| 2006/0076463 A1* | 4/2006 | Drew | ................. | F16M 11/105 |
| | | | | 248/121 |
| 2006/0231667 A1* | 10/2006 | Tsuo | ................. | F16M 11/041 |
| | | | | 242/384.5 |
| 2013/0044411 A1* | 2/2013 | Zhen | ................. | F16M 11/22 |
| | | | | 361/679.01 |
| 2015/0050077 A1* | 2/2015 | Huang | ................ | F16M 11/041 |
| | | | | 403/322.1 |

\* cited by examiner

_(1)_

QUICK RELEASE ASSEMBLY AND SUPPORT

CROSS-REFERENCE TO RELATED APPLICATION

This application claims the priority benefits of U.S. provisional application Ser. No. 62/861,300, filed on Jun. 13, 2019, and Taiwan application Ser. No. 108214926, filed on Nov. 11, 2019. The entirety of each of the above-mentioned patent applications is hereby incorporated by reference herein and made a part of this specification.

BACKGROUND OF THE INVENTION

1. Field of the Invention

The invention relates to a quick release assembly and a support, and in particular, to a quick release assembly and a support that can be applicable to display screens of different sizes.

2. Description of Related Art

Generally, a back surface of a liquid crystal display screen (LCD) is provided with a set of mounting holes (for example, a VESA standard mounting holes disclosed in CN207073682U), so that the display screen is screwed to a joint plate (a VESA plate) on a support.

However, such a screwing manner cannot be performed quickly and conveniently. For example, it is time-consuming for removing the display screen for maintenance or adjustment. Therefore, there is a display that has a quick release function and that is disclosed in TWM439830, the display including a display panel having a first engaging portion and a first fitting portion, a support, and a joint mechanism having a second engaging portion and a second fitting portion. In this way, the display panel can be quickly mounted to the support, or be quickly detached from the support. However, a back surface of a housing of such display panel is provided with a specific structure (for example, the first engaging portion, the first fitting portion, and accommodating space of a specific size), unlike a set of holes, which cannot be specified through an international agreement because of complexity involved, and therefore a display panel of one type can match only a support of a specific specification, which results in low commonality of production. In other words, a support of only one specification usually cannot match display panels of different sizes and weights (because of different sets of holes), and development and manufacturing costs cannot be effectively reduced.

SUMMARY OF THE INVENTION

The invention provides a quick release assembly and a support that can be applicable to display screens of different sizes.

A quick release assembly of the invention is configured to attach a display screen having at least one set of mounting holes to a support. The quick release assembly includes a first quick release unit and a second quick release unit. The first quick release unit is disposed on the support and includes a first cover, an engaging plate, a button, a driven-stop plate, and an elastic member. The first cover has an opening. The engaging plate is assembled to the first cover, and the engaging plate has at least one aligning hook. The button is partially exposed from the opening. The driven-stop plate is disposed between the first cover and the engaging plate and is linked with the button, and the driven-stop plate includes at least one fixing hook. The elastic member has one end abutting against the driven-stop plate and the other end abutting against one of the first cover and the engaging plate. The second quick release unit includes: a joint plate, a second cover, and a plurality of fixing members. The joint plate has at least one aligning hole, at least one fixing hole, and at least one set of attachment holes. The second cover is assembled to the joint plate and includes a notch. The plurality of fixing members are correspondingly inserted into the attachment holes and the mounting holes respectively, so as to secure the display screen to the joint plate. When the first quick release unit is engaged with the second quick release unit via the notch, the aligning hook is correspondingly fit within the aligning hole, and the fixing hook is correspondingly fit within the fixing hole, so that the display screen is attached to the support. When an external force is applied to press the button, the driven-stop plate is driven, causing the fixing hook to be detached from the fixing hole, so that the first quick release and the second quick release unit can be separated from each other.

In an embodiment of the invention, the joint plate has at least one first wing protruding toward the second cover, and the aligning hole is correspondingly formed on the first wing.

In an embodiment of the invention, the joint plate has at least one second wing protruding toward the second cover, and the fixing hole is correspondingly formed on the second wing.

In an embodiment of the invention, the second cover has a recessed space corresponding to the notch, and when the first quick release unit is engaged with the second quick release unit, the engaging plate is received in the recessed space and abuts against the joint plate.

In an embodiment of the invention, the second cover has a main plate, an external surrounding plate connected to the main plate, and an internal surrounding plate connected to the main plate, the notch is formed on the main plate, and the internal surrounding plate surrounds the notch and extends toward the joint plate, so that the recessed space is defined.

In an embodiment of the invention, at least one first fracture and at least one second fracture are formed on the internal surrounding plate, the first wing is received in the first fracture, and the second wing is correspondingly received in the second fracture.

In an embodiment of the invention, a number of sets of the attachment holes is greater than or equal to two, and each set of attachment holes meet a specification defined by the VESA.

In an embodiment of the invention, the button has a sloped surface, the driven-stop plate has an inclined wall surface, and the sloped surface is adapted to contact the inclined wall surface.

In an embodiment of the invention, the first quick release unit further includes a spring, the engaging plate has a first positioning column penetrating through the driven-stop plate, and the spring is sleeved on the first positioning column.

In an embodiment of the invention, the driven-stop plate has at least one sliding groove, the first cover has at least one second positioning column, and the second positioning column correspondingly penetrates through the sliding groove.

In an embodiment of the invention, the button and the driven-stop plate are integrally formed in structure.

A support capable of attaching a plurality of display screens having at least one set of mounting holes to the support is provided in the invention. The support includes a body and a quick release assembly. The quick release assembly includes a first quick release unit and a second quick release unit, where the first quick release unit is attached to the body, and the second quick release unit is attached to the display screen. The first quick release unit includes: a first cover, an engaging plate, a button, a driven-stop plate, and an elastic member. The first cover includes an opening. The engaging plate is assembled to the first cover, and the engaging plate includes at least one aligning hook. The button is partially exposed from the opening. The driven-stop plate is disposed between the first cover and the engaging plate and is linked with the button, and the driven-stop plate includes at least one fixing hook. The elastic member has one end abutting against the driven-stop plate and the other end abutting against one of the first cover and the engaging plate. The second quick release unit includes: a joint plate, a second cover, and a plurality of fixing members. The joint plate has at least one aligning hole, at least one fixing hole, and at least one set of attachment holes. The second cover is assembled to the joint plate and includes a notch. The plurality of fixing members are correspondingly inserted into the attachment holes and the mounting holes respectively, so as to secure the display screen to the joint plate. When the first quick release unit is engaged with the second quick release unit via the notch, the aligning hook is correspondingly fit within the aligning hole, and the fixing hook is correspondingly fit within the fixing hole, so that the display screen is attached to the support. When an external force is applied to press the button, the driven-stop plate is driven, causing the fixing hook to be detached from the fixing hole, so that the first quick release and the second quick release unit can be separated from each other.

In an embodiment of the invention, the body is a stand body.

In an embodiment of the invention, the body includes: a base; and an upright disposed vertically on the base, the upright having an attachment end, and the first quick release unit is attached to the attachment end.

In an embodiment of the invention, the upright includes a sliding rail, and the body further includes a sliding trunk movably disposed in the sliding rail.

In an embodiment of the invention, the body is a connecting-arm type body.

In an embodiment of the invention, the joint plate has at least one first wing protruding toward the second cover, and the aligning hole is correspondingly formed on the first wing.

In an embodiment of the invention, the joint plate has at least one second wing protruding toward the second cover, and the fixing hole is correspondingly formed on the second wing.

In an embodiment of the invention, the second cover has a recessed space corresponding to the notch, and when the first quick release unit is engaged with the second quick release unit, the engaging plate is received in the recessed space and abuts against the joint plate.

In an embodiment of the invention, the second cover has a main plate, an external surrounding plate connected to the main plate, and an internal surrounding plate connected to the main plate, the notch is formed on the main plate, and the internal surrounding plate surrounds the notch and extends toward the joint plate, so that the recessed space is defined.

In an embodiment of the invention, at least one first fracture and at least one second fracture are formed on the internal surrounding plate, the first wing is received in the first fracture, and the second wing is correspondingly received in the second fracture.

In an embodiment of the invention, a number of sets of the attachment holes is greater than or equal to two, and each set of attachment holes meet a specification defined by the VESA.

In an embodiment of the invention, the button has a sloped surface, the driven-stop plate has an inclined wall surface, and the sloped surface is adapted to contact the inclined wall surface.

In an embodiment of the invention, the first quick release unit further includes a spring, the engaging plate has a first positioning column penetrating through the driven-stop plate, and the spring is sleeved on the first positioning column.

In an embodiment of the invention, the driven-stop plate has at least one sliding groove, the first cover has at least one second positioning column, and the second positioning column correspondingly penetrates through the sliding groove.

In an embodiment of the invention, the button and the driven-stop plate are integrally formed in structure.

Based on the foregoing, the second quick release unit of the quick release assembly of the invention includes the at least one set of attachment holes, and therefore the joint plate of the second quick release unit of the quick release assembly can correspond to hole locations of display screens of different sizes to be attached to the display screens, and the display screen can be removed conveniently and easily from the support by dismantling the first quick release unit and the second quick release unit.

To make the features and advantages of the invention clear and easy to understand, the following gives a detailed description of embodiments with reference to accompanying drawings.

DESCRIPTION OF THE EMBODIMENTS

The invention provides a quick release assembly and a support using the quick release assembly. The quick release assembly of the invention includes at least one set of attachment holes, and different sets of attachment holes corresponds to different sets of hole locations of display screens of different sizes respectively. Therefore, the support can be applicable to the display screens of different sizes using the quick release assembly.

In addition, the quick release assembly is easy to mount and dismantle, so that it is convenient for a user to quickly and simply mount a display screen onto the support or remove the display screen from the support.

The following describes the quick release assembly and the support in the invention.

First Embodiment

Figure 1A:
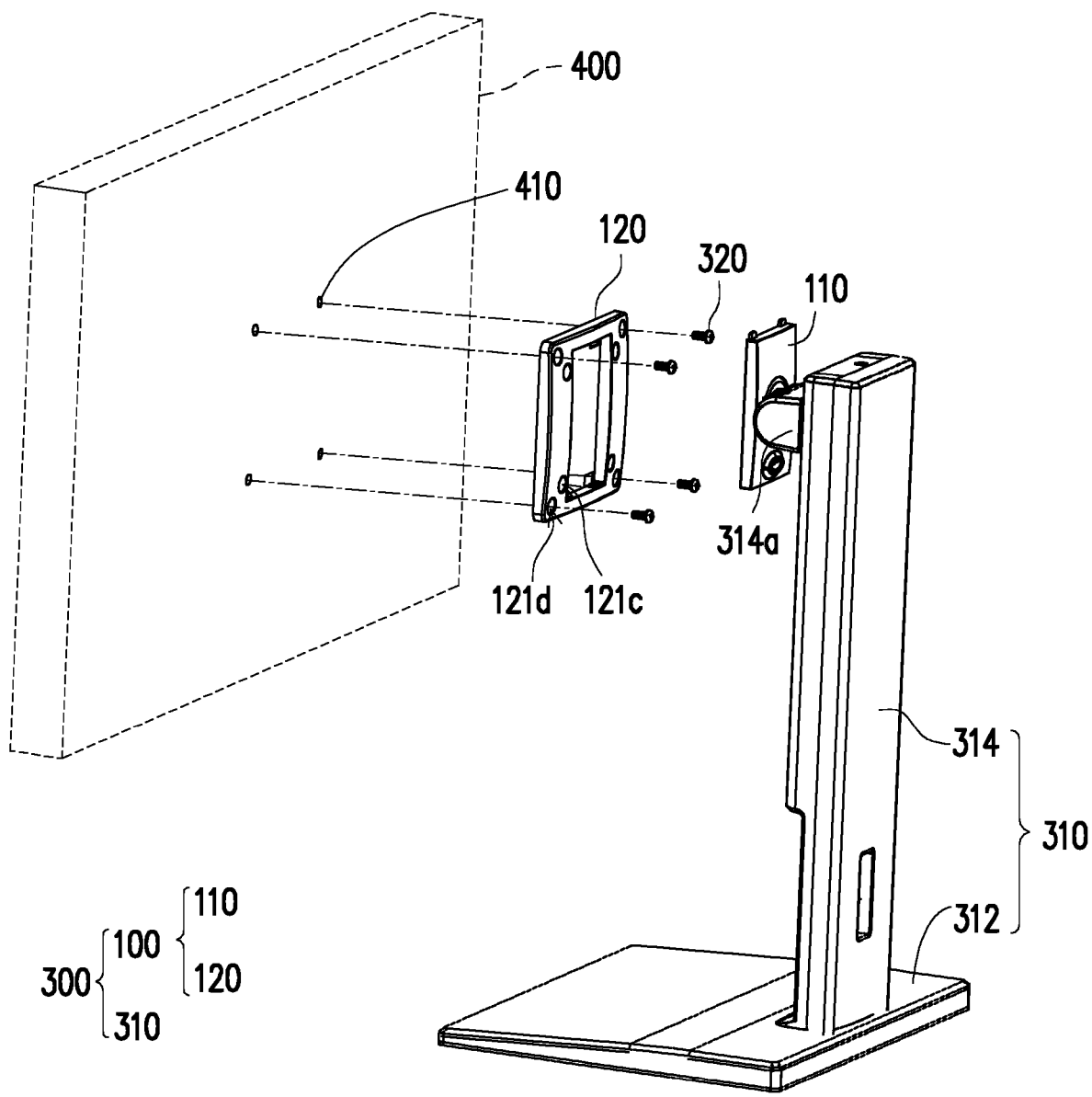
FIG. 1A is a schematic exploded view of a display screen and a support according to a first embodiment of the invention.

FIG. 1A is a schematic exploded view of a display screen and a support according to a first embodiment of the invention. Referring to FIG. 1A, a quick release assembly 100 in the invention is applicable to display screens 400 of different sizes or weights. In other words, a support 300 having the quick release assembly 100 can be used to support the display screens 400 of different sizes. The quick release assembly 100 is secured to mounting holes 410 (only one set of mounting holes 410 shown in the figure) of the display screen 400 by using a plurality of fixing members 320. For example, the fixing members 320 are screws, but are not limited thereto, or may be a combination of studs and nuts, or other separate elements or combined elements that may be applied, which are selected depending on an actual requirement. Incidentally, the display screen 400 may have not only one set of mounting holes 410.

Figure 2:
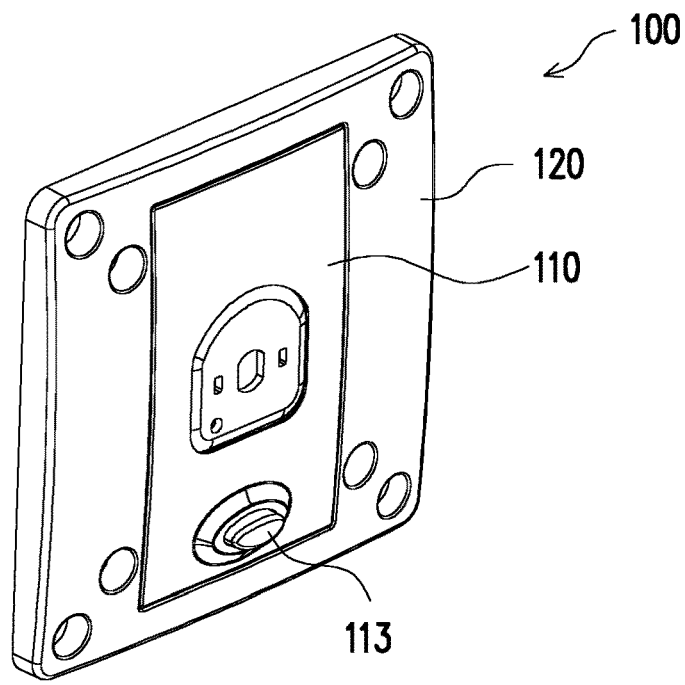
FIG. 2 is a schematic view of assembly of a quick release assembly of FIG. 1A.
Figure 3:
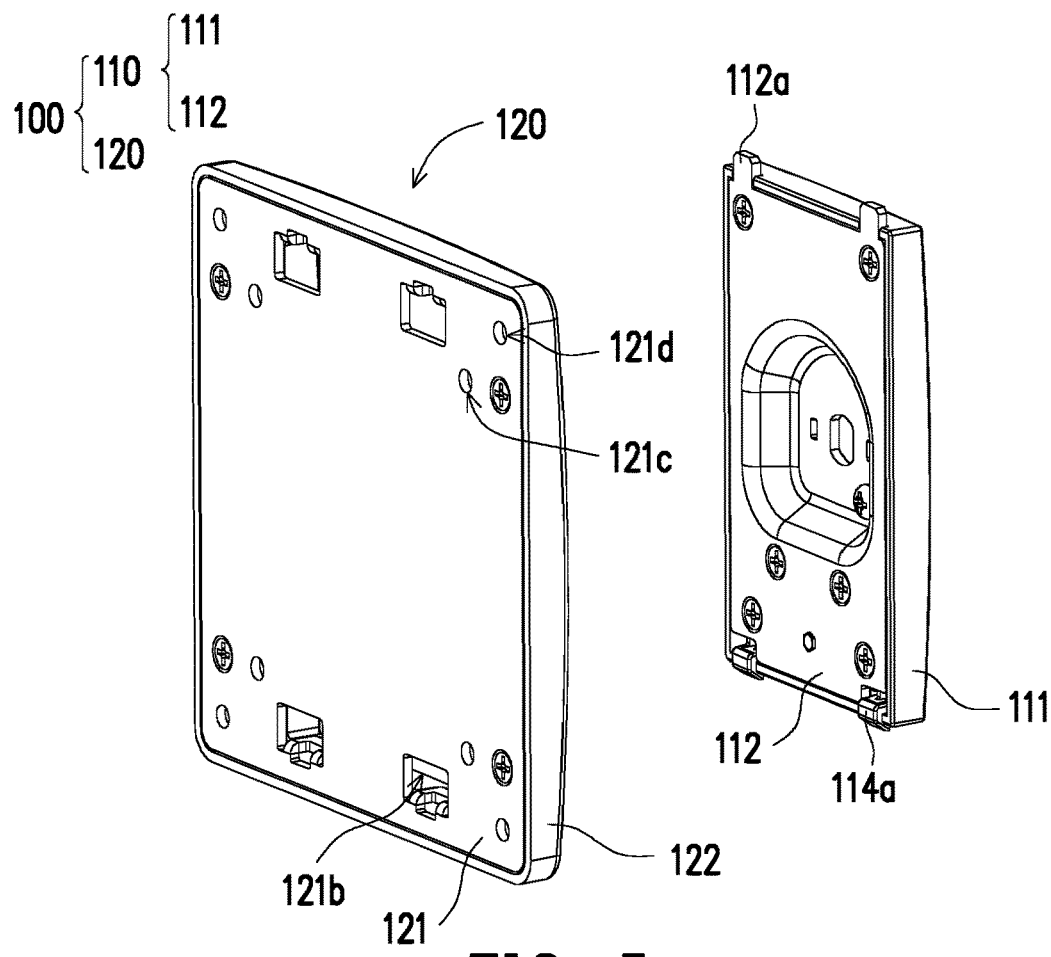
FIG. 3 is a schematic exploded view of a first quick release unit and a second quick unit of the quick release assembly of FIG. 2.

FIG. 2 is a schematic view of assembly of a quick release assembly in FIG. 1A. FIG. 3 is a schematic exploded view of a first quick release unit and a second quick unit of the quick release assembly of FIG. 2. Referring to FIG. 1A, FIG. 2, and FIG. 3, a support 300 includes a body 310 and a quick release assembly 100. The quick release assembly 100 includes a first quick release unit 110 and a second quick release unit 120. The first quick release unit 110 is attached to the body 310, and the second quick release unit 120 is attached to a display screen 400.

In the present embodiment, the body 310 is a stand body. The stand body is the body 310 including a base 312 and an upright 314. The base 312 may be placed on a working surface such as a desktop, and the upright 314 is vertically disposed on the base 312. The upright 314 has an attachment end 314a, and the first quick release unit 110 of the quick release assembly 100 is attached to the attachment end 314a. In an implementation, a height of the attachment end 314a relative to the base 312 may be fixed. However, in another implementation, the upright 314 may have at least one sliding rail (not shown), the body 310 further includes a sliding trunk (not shown) movably disposed in the sliding rail, and the attachment end 314a is assembled to the sliding trunk (not shown). In this way, a height of the display screen 400 relative to the base 312 may be changed by changing a position of the sliding trunk (not shown) in the sliding rail (not shown).

Figure 1B:
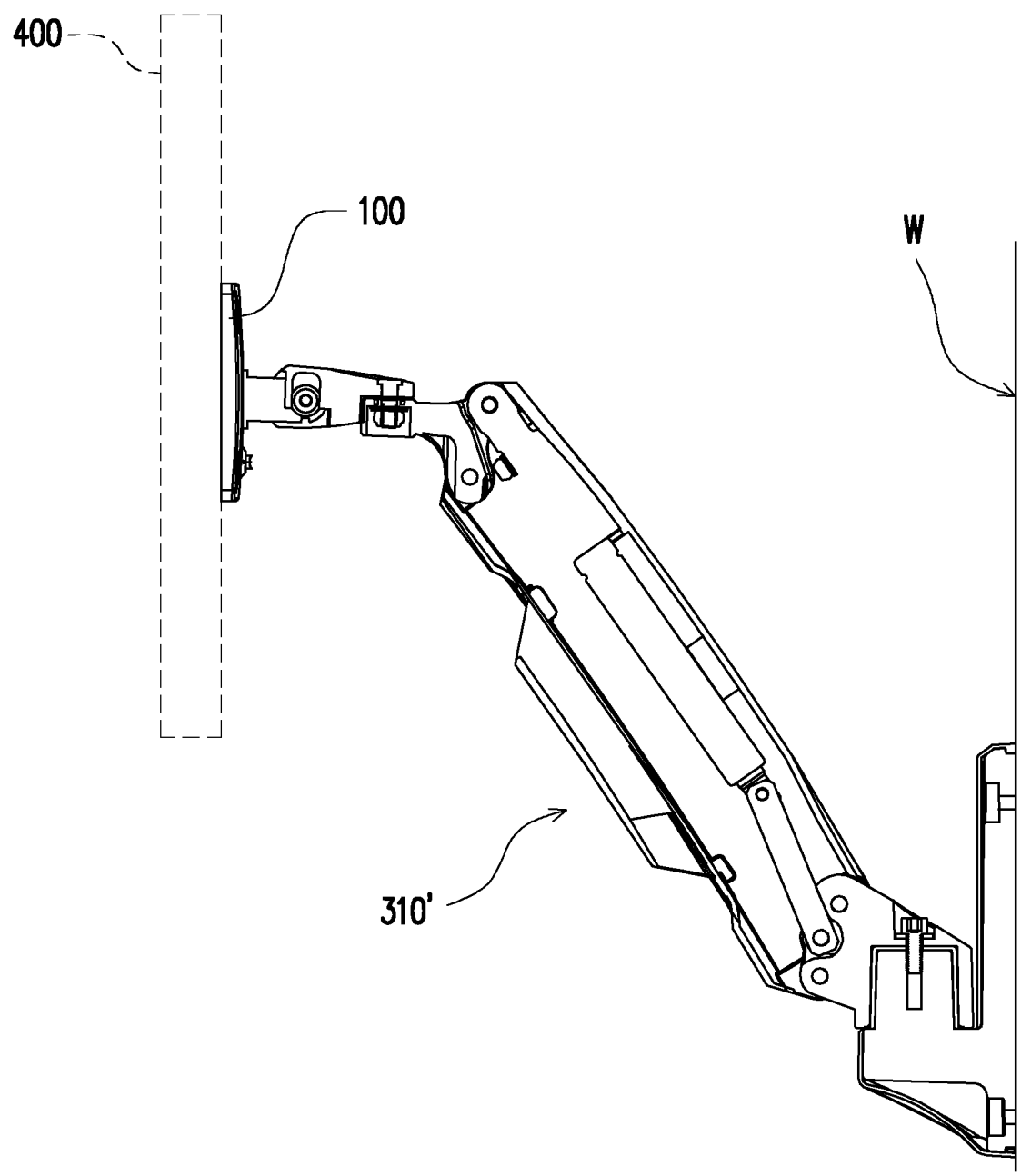
FIG. 1B is a schematic view of the display screen shown in FIG. 0.1 assembled onto an arm body according to another embodiment of the invention.

In comparison to the stand body, in another embodiment that is shown as FIG. 1B, the body 310' may also be an arm (or articulated arm) body. The connecting-arm type body 310' may be attached to a ceiling or a wall surface W, and the connecting-arm type body 310' may be formed by a plurality of connecting rods, and can enable the display screen 400 attached to the body 310' to stop within a movable range of the body 310'.

Figure 4:
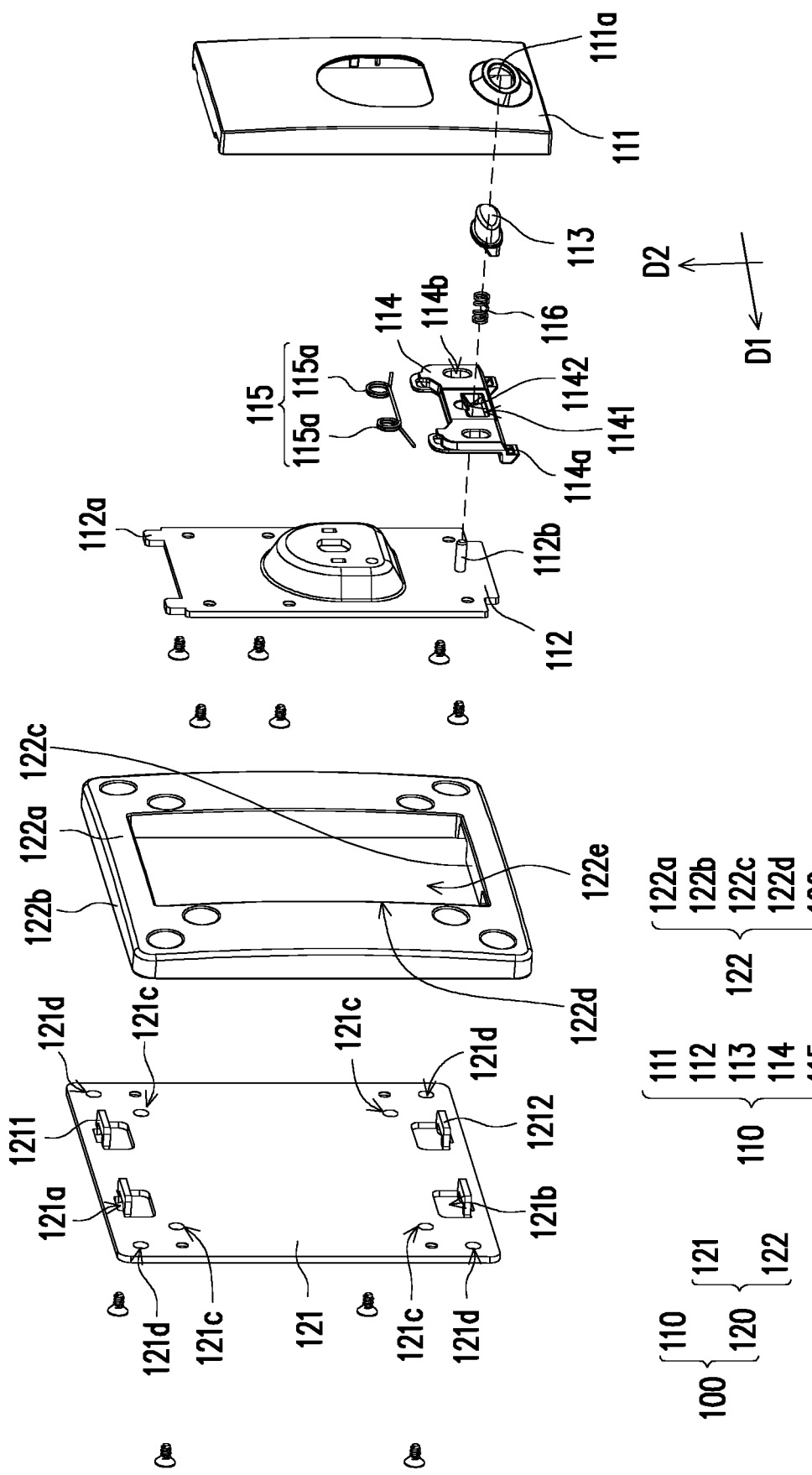
FIG. 4 is a schematic exploded view of the quick release assembly of FIG. 3.
Figure 5:
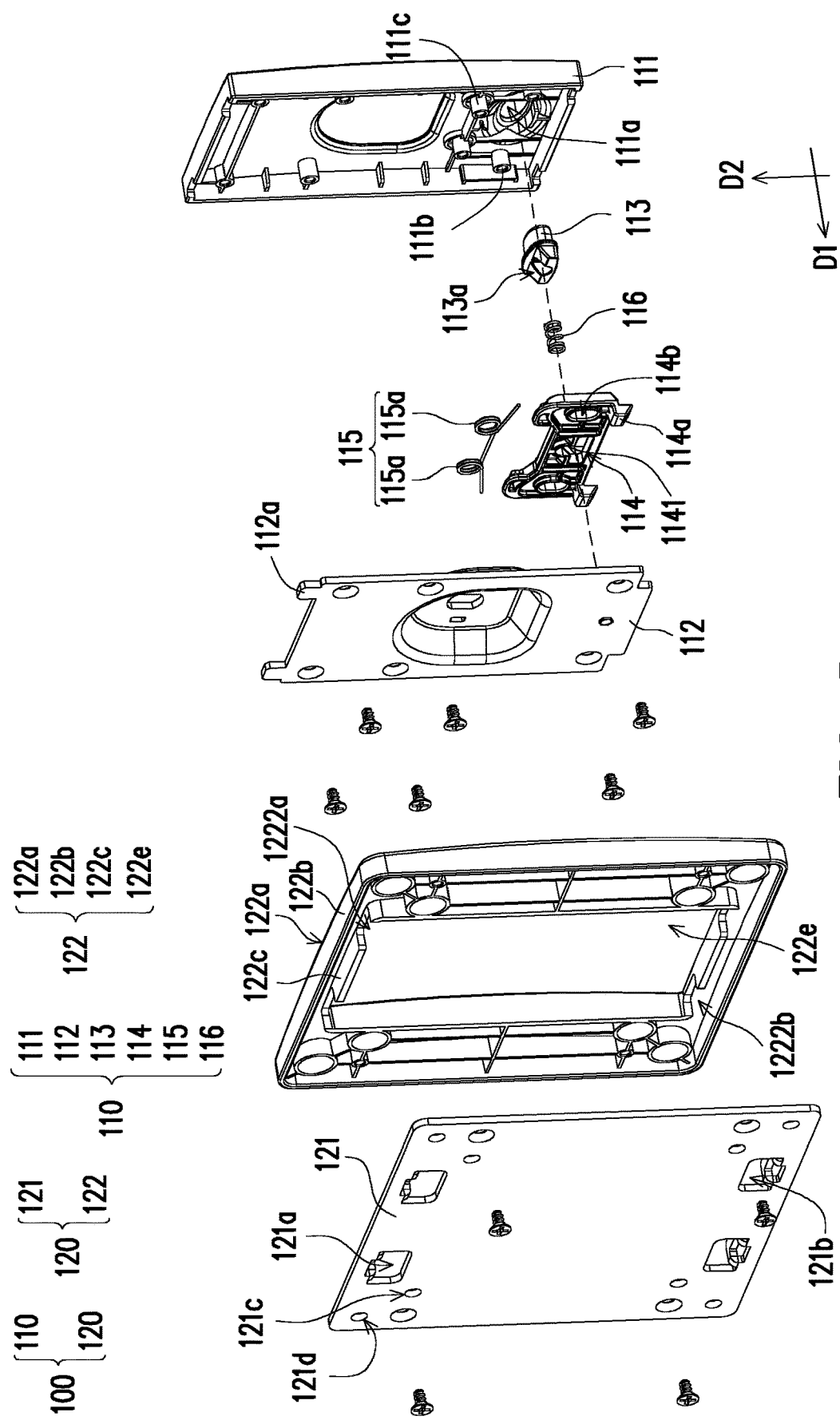
FIG. 5 is a schematic view of FIG. 4 from another viewing angle.

FIG. 4 is a schematic exploded view of the quick release assembly of FIG. 3. FIG. 5 is a schematic view of FIG. 4 from another viewing angle. Referring to FIG. 3, FIG. 4 and FIG. 5, a first quick release unit 110 includes a first cover 111, an engaging plate 112, a button 113, a driven-stop plate 114, and an elastic element 115. The first cover 111 and the engaging plate 112 may be assembled together in a screwing manner. The driven-stop plate 114 and the elastic element 115 are disposed between the first cover 111 and the engaging plate 112. The button 113 is linked with the driven-stop plate 114, and the driven-stop plate 114 has a pair of fixing hooks 114a protruding from the first cover 111 and the engaging plate 112. The elastic element 115 is disposed on an internal surface of the first cover 111 and contacts with the driven-stop plate 114, to provide an elastic restoring force to drive the driven-stop plate 114 back to an original position after the driven-stop plate 114 leaves the original position. The engaging plate 112 has a pair of aligning hooks 112a, and the aligning hooks 112a are disposed with a distance spaced apart. The fixing hooks 114a are disposed in a same manner as the aligning hooks 112a, and the fixing hooks 114a are also disposed with a distance spaced apart.

The second quick release unit 120 includes a joint plate 121 and a second cover 122. The joint plate 121 and the second cover 122 can be assembled to each other in the screwing manner. The joint plate 121 has a pair of aligning holes 121a, a pair of fixing holes 121b, and two sets of attachment holes 121c and 121d, but is not limited thereto. For example, there may be one set or more than three sets of attachment holes, but in principle, any set of attachment holes is selected according to a length and a width of a hole location that are defined by the VESA, for example, 50 mm×50 mm, 75 mm×75 mm, or 100 mm×200 mm.

The joint plate 121 is attached to the mounting holes 410 of the display screen 400 using the fixing members 320 to match the one set of attachment holes 121c or 121d. The aligning hooks 112a of the engaging plate 112 of the first quick release unit 110 is correspondingly fit within the aligning holes 121a, and the fixing hooks 114a of the driven-stop plate 114 of the first quick release unit 110 is correspondingly fit within the fixing holes 121b, so that the first quick release unit 110 is assembled to the second quick release unit 120. In other words, because almost all back surfaces of the display screens 400 are provided previously with hole locations defined by the VESA, the joint plate 121 may be fixed to the back surface of the display screen 400 in, for example, the screwing manner, and therefore the back surface of the display screen 400 does not need to be provided with a complex quick release structure in advance.

Specifically, the joint plate 121 has a pair of first wings 1211 protruding toward the second cover 122, and the foregoing aligning holes 121a are formed on the first wings 1211. Numbers of first wings 1211 and aligning holes 121a that are disposed are not limited by the example of the present embodiment. A person in the art can change the numbers of first wings 1211 and aligning holes 121a to one or at least three according to an actual requirement and accordingly increase and decrease a number of the aligning hooks 112a.

In addition, the joint plate 121 has a pair of second wings 1212 protruding toward the second cover 122, and the foregoing fixing holes 121b are formed on the second wings 1212. Numbers of second wings 1212 and fixing holes 121b are not limited by the example of the present embodiment. A person in the art can change the numbers of second wings 1212 and fixing holes 121b to one or at least three according to an actual requirement and accordingly increase and decrease a number of the fixing hooks 114a.

The second cover 122 includes a main plate 122a, an external surrounding plate 122b, and an internal surrounding plate 122c connected to one another. A notch 122d is formed on the main plate 122a, and the internal surrounding plate 122c surrounds the notch 122d and extends toward the joint plate 121, so that a recessed space 122e corresponding to the notch 122d is defined. At least one first fracture 1222a and at least one second fracture 1222b are formed on the internal surrounding plate 122c. The first wings 1211 are received in the first fracture 1222a, and the second wings 1212 are correspondingly received in the second fracture 1222b. The first wings 1211 and the second wings 1212 further abut against portions of the internal surrounding plate 122c where the first fracture 1222a and the second fracture 1222b are formed, so as to increase a strength of the second cover 122. When the first quick release unit 110 is engaged with the second quick release unit 120, the engaging plate 112 is received in the recessed space 122e and abuts against the joint plate 121.

Figure 12:
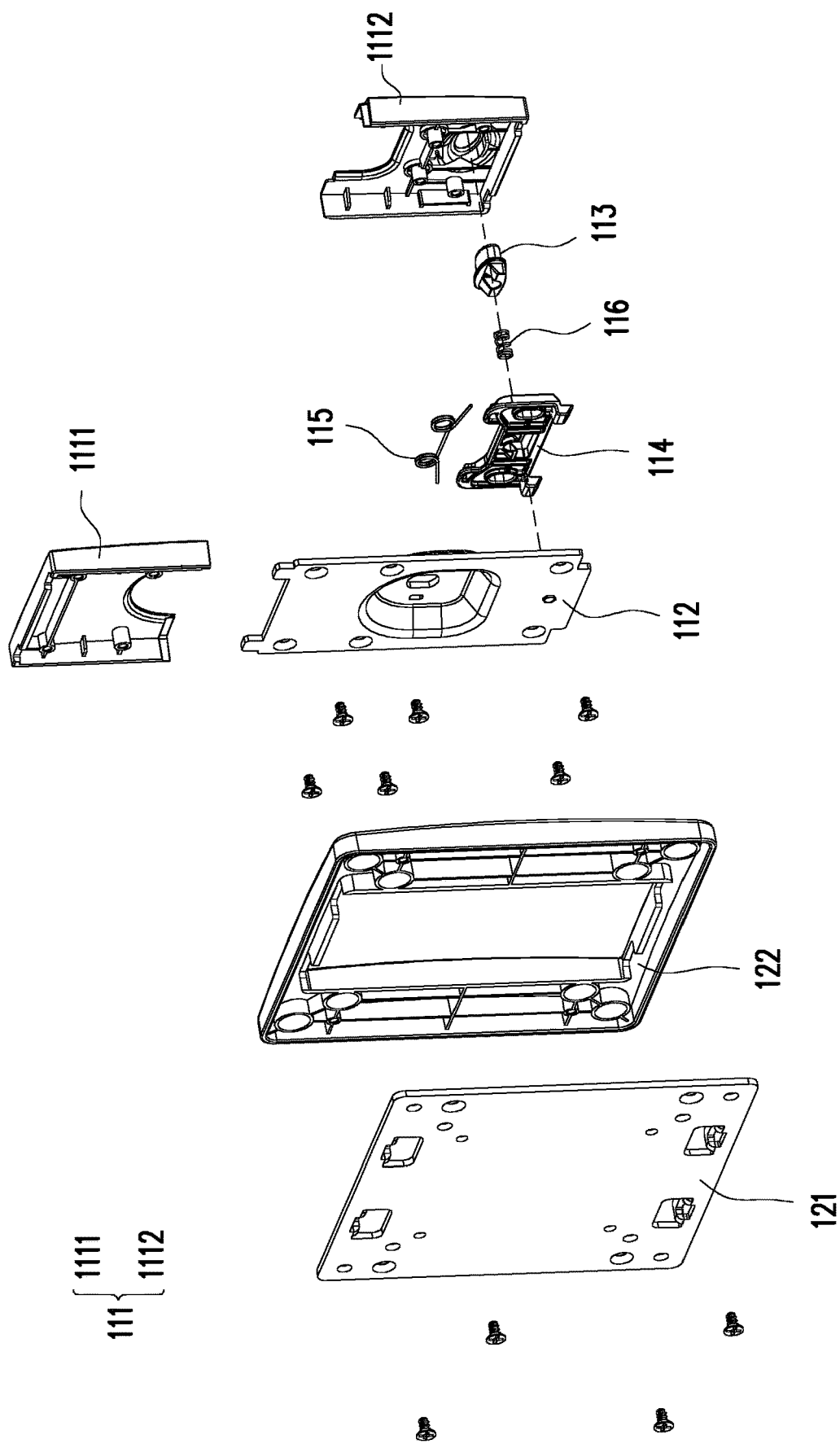
FIG. 12 is a schematic view of a first cover divided into an upper cover and a lower cover.

In the present embodiment, the first cover 111 includes a penetrating opening 111a, the button 113 is located in the opening 111a, and the button 113 may be pressed to drive the driven-stop plate 114 to move. In other implementations, a flexible material (for example, mylar) with deformation capability may be disposed at the opening 111a, to shield the button 113 without affecting the pressing of the button 113. Incidentally, the first cover 111 may be a complete cover, or may be formed by two cover bodies of an upper cover 1111 and a lower cover 1112, as shown in FIG. 12. Alternatively, the first cover 111 may be formed by more than two cover bodies, which may be determined according to an actual requirement. A manner in which the two cover bodies of the upper cover 1111 and the lower cover 1112 are combined has an advantage of conveniently assembling.

Carrying on with the foregoing, in the present embodiment, directions in which the button 113 and the driven-stop plate 114 move may be limited through internal structure design of the first cover 111 or the engaging plate 112. In the present embodiment, the direction in which the button 113 moves and the direction in which the driven-stop plate 114 moves are perpendicular to each other.

Specifically, the engaging plate 112 of the present embodiment includes a first positioning column 112b extending toward the first cover 111, and the driven-stop plate 114 includes a central perforation 1141. The first positioning column 112b penetrates through the central perforation 1141 of the driven-stop plate 114 and may extend into the button 113, so that the button 113 may move in an axial direction (that is, a first direction D1) of the first positioning column 112b, to be relatively close to or away from the engaging plate 112. In other embodiments, a pair of limiting walls extending toward the engaging plate 112 may be formed on the first cover 111, to limit the direction in which the button 113 moves.

Carrying on with the foregoing, the button 113 includes a sloped surface 113a, and the driven-stop plate 114 includes an inclined wall surface 1142 (as shown in FIG. 4) adjacent to the central perforation 1141. During a process in which the button 113 is pressed by an external force to move in the axial direction of the first positioning column 112b to approach the engaging plate 112, the sloped surface 113a contacts with the inclined wall surface 1142 of the driven-stop plate 114, and as the button 113 continues to approach the engaging plate 112, the sloped surface 113a cooperates with the inclined wall surface 1142 to push against each other, so that the driven-stop plate 114 moves toward a second direction D2 (that is, an upward direction in FIG. 4 or FIG. 5).

The first cover 111 includes a pair of second positioning columns 111b at one side close to the engaging plate 112, the driven-stop plate 114 includes a pair of sliding grooves 114b, and the second positioning columns 111b are correspondingly located in the sliding grooves 114b. The second positioning columns 111b are engaged with the sliding grooves 114b, so that the direction and a distance in which the driven-stop plate 114 moves may be precisely defined. Although the present embodiment is described with the second positioning columns 111b disposed on the first cover 111 and the sliding grooves 114b disposed on the driven-stop plate 114, a person in the art can learn that a same effect can be implemented by disposing the second positioning columns 111b on the driven-stop plate 114 and disposing the sliding grooves 114b on the first cover 111.

In addition, the first cover 111 includes a pair of third positioning columns 111c at one side facing the engaging plate 112, and the elastic member 115 includes two ring portions 115a, the ring portions 115a being each correspondingly sleeved on the third positioning columns 111c.

In addition, in order to enable the button 113 to return to an original position after the external force is removed, the first quick release unit 110 further includes a spring 116. In the present embodiment, the spring 116 is a compression spring. The spring 116 may be sleeved on the first positioning column 112b and be located inside the button 113. Under a normal condition (the button 113 being not pressed by an external force), the spring 116 tends to push the button 113 away from the engaging plate 112.

In addition, during a process in which the button 113 is driven by the spring 116 to move back to the original position, an elastic restoring force of the elastic member 115 is applied to the driven-stop plate 114, to drive the driven-stop plate 114 to move back to the original position. In other words, under a normal condition (the button 113 being not pressed by an external force), the elastic member 115 tends to push the driven-stop plate 114 in an opposite direction (for example, a downward direction in FIG. 4 or FIG. 5) of the second direction D2.

Figure 6:
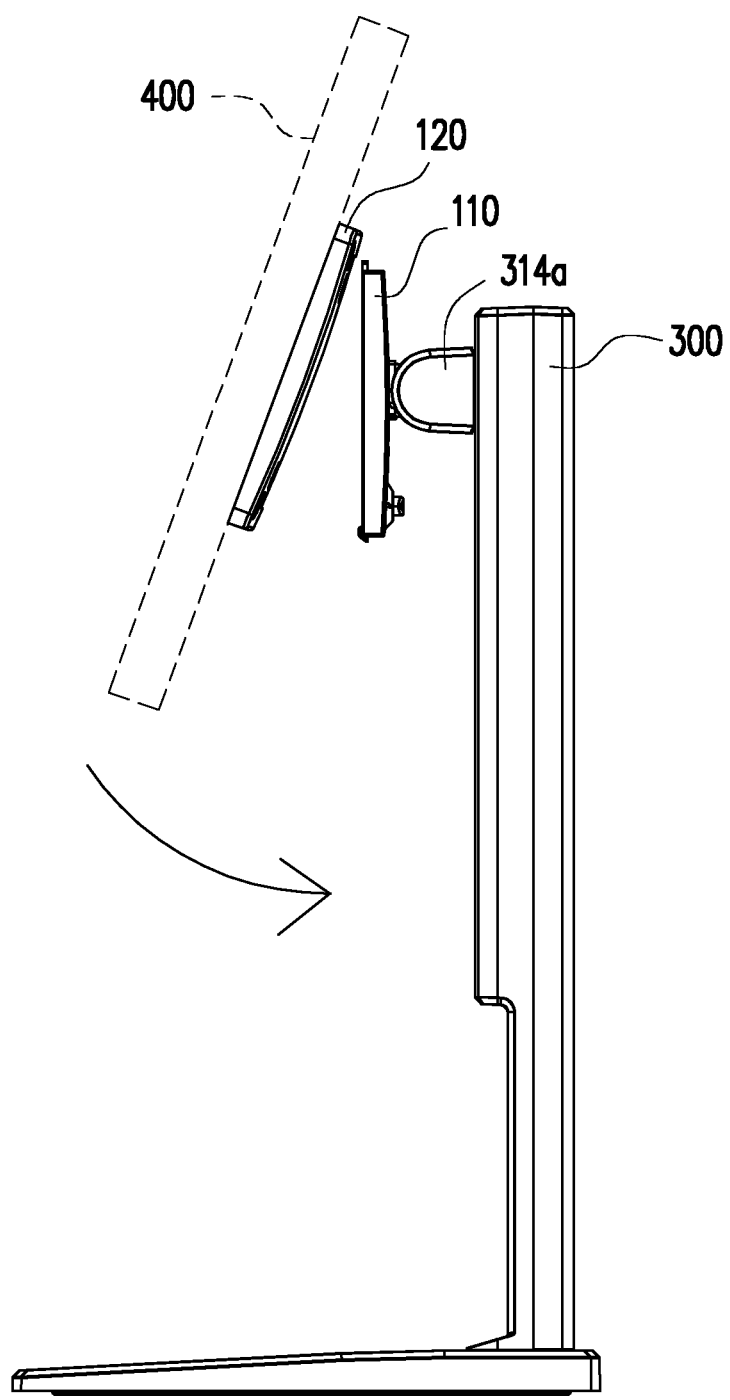
FIG. 6 and FIG. 7 are schematic views of a display screen assembled to a support.
Figure 7:
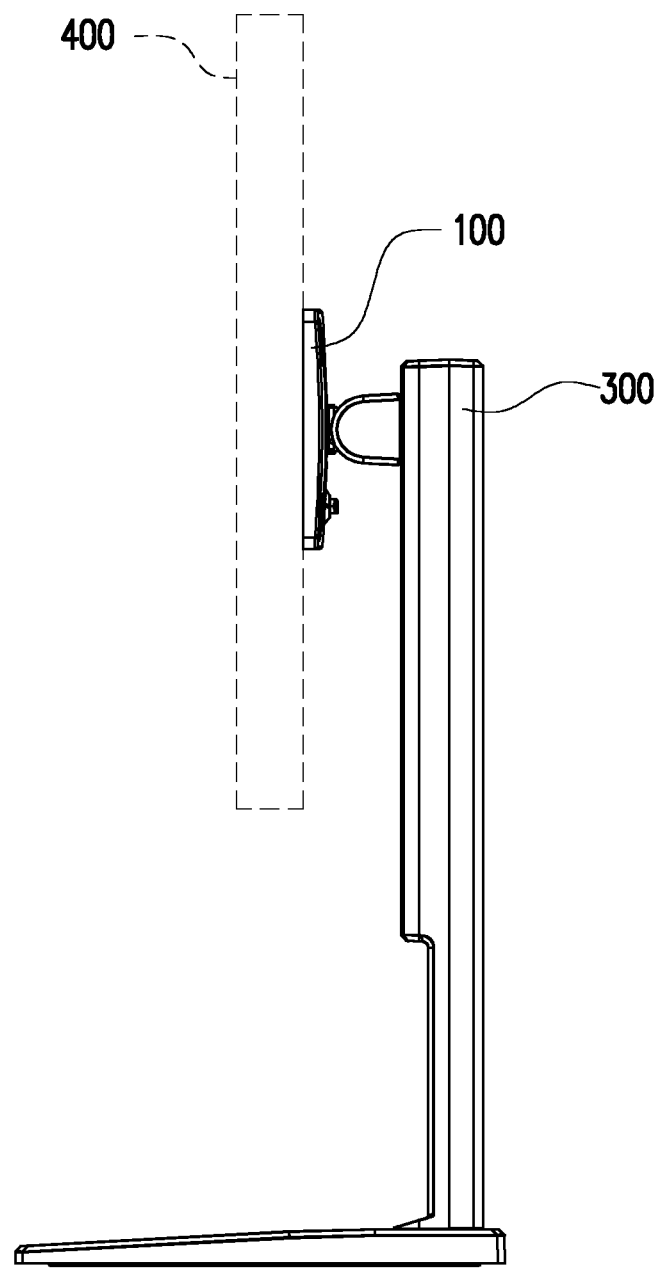

FIG. 6 and FIG. 7 are schematic views of a display screen assembled to a support. Referring to FIG. 1A, FIG. 3, and FIG. 6, when a support 300 is used, a second quick release unit 120 is attached to a display screen 400, where a first set of attachment holes 121c of a joint plate 121 of the second quick release unit 120 correspond to hole locations of the display screen 400, and a first quick release unit 110 is attached to an attachment end 314a of an upright 314 of a body 310.

Then, the aligning hooks 112a of the engaging plate 112 of the first quick releasing unit 110 are correspondingly fit within the aligning holes 121a (shown in FIG. 4) of the joint plate 121 of the second quick release unit 120. Then, a lower end of the display screen 400 is rotated with a junction of the aligning hook 112a and the aligning hole 121a as a rotation axis, to cause fixing hooks 114a to be fit within fixing holes 121b. In this way, the display screen 400 is assembled to the body 310 of the support 300 using the quick release assembly 100, as shown in FIG. 7.

To dismount the display screen 400 (for example, for maintenance or adjustment), reference may be made to FIG. 2 and FIG. 5. As long as the button 113 is pushed by an applied force to move in a first direction D1, and as the button 113 moves closer to the engaging plate 112, the driven-stop plate 114 moves in a second direction D2 due to interference of a sloped surface 113a of the button 113 and the driven-stop plate 114.

Figure 8:
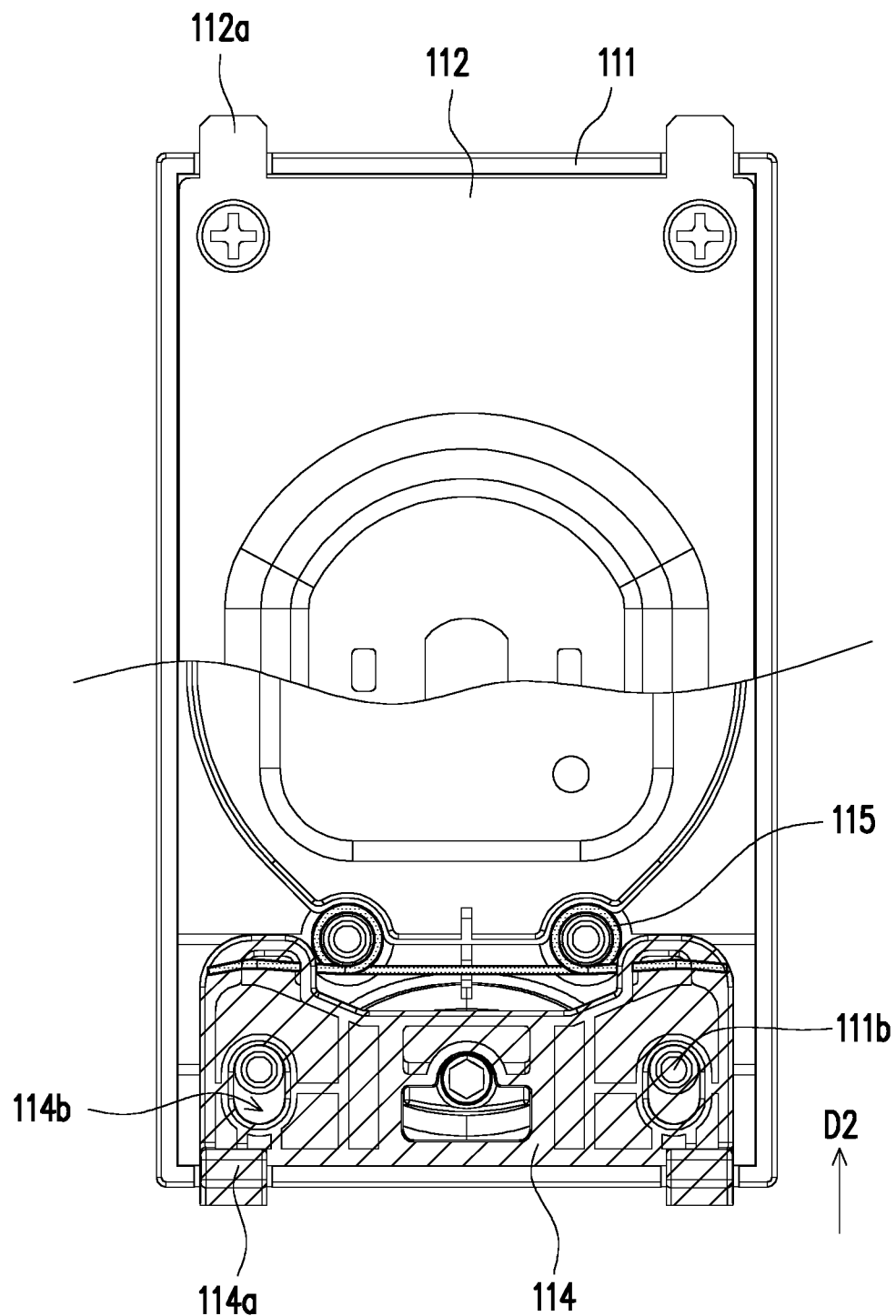
FIG. 8 and FIG. 9 are schematic views of the second quick release unit removed from the first release unit caused by a driven-stop plate pushed by a button to move.
Figure 9:
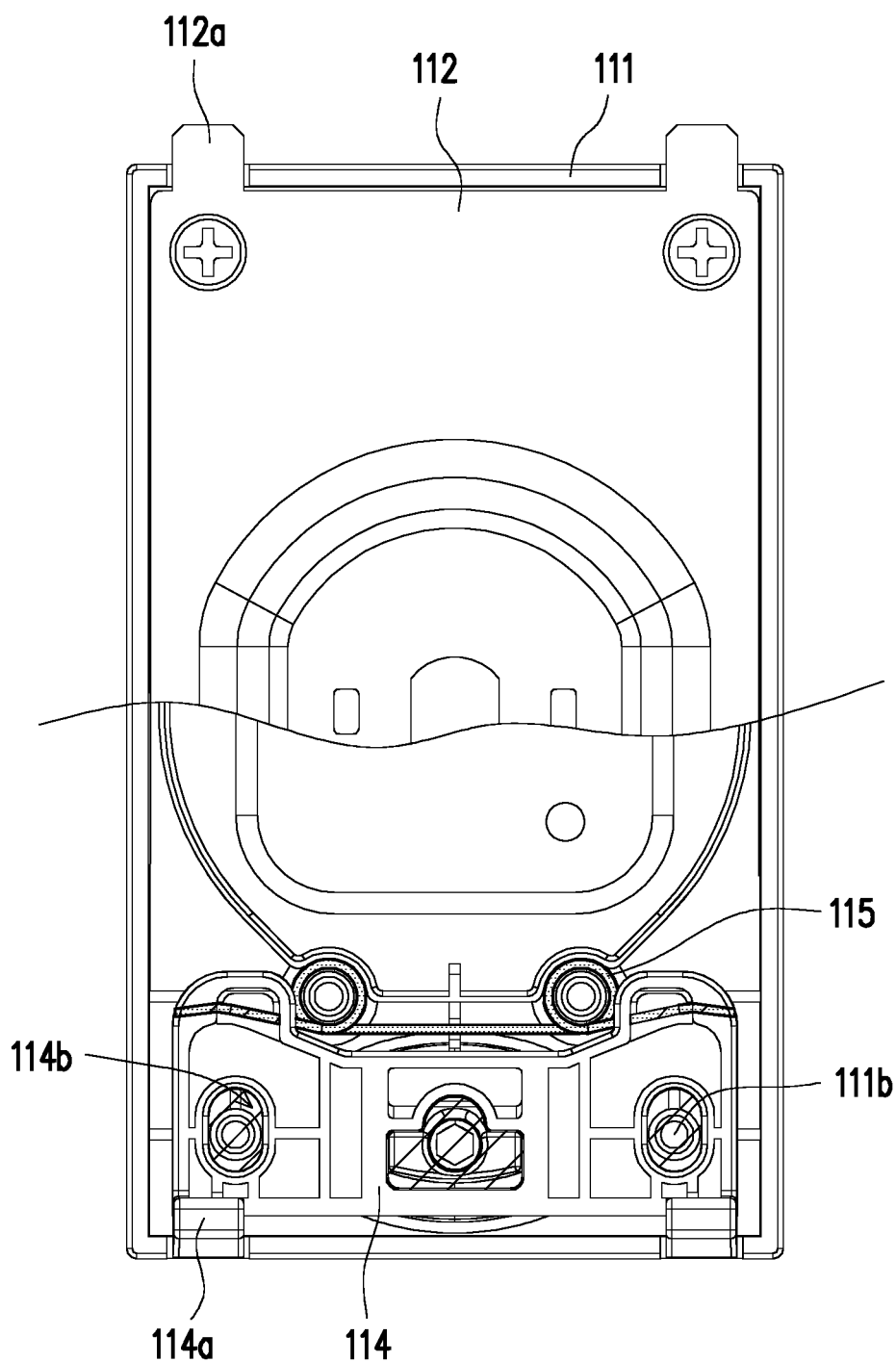

FIG. 8 and FIG. 9 are schematic views of release of the second quick release unit from the first release unit because of driving, by the button, the driven-stop plate to move. Referring to FIG. 4, FIG. 5, FIG. 8, and FIG. 9, more specifically, when the button 113 is pressured by the force, the button 113 moves in the first direction D1, and the sloped surface 113a of the button 113 pushes the inclined wall surface 1142 of the driven-stop plate 114 to move. Because of cooperation between the sloped surface 113a and the inclined wall surface 1142, the force that causes the button 113 to move in the first direction D1 generates a component force that causes the driven-stop plate 114 to move in the second direction D2, and then, the fixing hooks 114a are separated from the fixing holes 121b.

It may be learned from FIG. 8 and FIG. 9, the driven-stop plate 114 moves in the second direction D2, and the second positioning columns 111b move from relatively lower parts of the sliding grooves 114b to relatively upper parts of the sliding grooves 114b. Incidentally, a length of the sliding groove 114b may control a distance the driven-stop plate 114 moves in the second direction D2, to prevent an excessive distance of movement of the driven-stop plate 114 causing interference with other structures, so that the driven-stop plate 114 or other components can work smoothly.

In addition, when the second positioning columns 111b are located at the relatively upper parts of the sliding grooves 114b, the driven-stop plate 114 presses the elastic member 115, and the elastic member 115 deforms and stores an elastic restoring force.

After the fixing hooks 114a are separated from the fixing holes 121b, a user may stop applying pressure to the button 113. A spring 116 is disposed between the driven-stop plate 114 and the button 113, so that the button 113 can move to the original position in an opposite direction of the first direction D1.

In addition, as the button 113 moves in the opposite direction of the first direction D1, the interference between the sloped surface 113a of the button 113 and the driven-stop plate 114 gradually decrease, and the elastic restoring force provided by the elastic member 115 keeps pushing the driven-stop plate 114 to the original position. Therefore, the fixing hooks 114a of the driven-stop plate 114 will also move back to the original position finally.

Afterwards, the user moves the display screen 400 slightly upward, so that the aligning hooks 112a are released from the aligning holes 121a, the second quick release unit 120 is completely released from the first quick release unit 110, and the display screen 400 is disassembled from the body 310 of the support 300.

In this case, the user may also remove the second quick release unit 120 from the display screen 400, and then attach the second quick release unit 120 to another display screen (not shown) of different sizes or weights using the second set of attachment holes 121d of the joint plate 121 of the second quick release unit 120.

Then, through repeating the foregoing assembly steps of the first quick release unit 110 and the second quick release unit 120, another display screen (not shown) of different sizes or weights can be assembled to the support 300.

It is additionally noted that, in order to adapt to the display screens 400 of different weights, the support 300 is usually an adjustable mechanism (not shown) with support force, such as a mechanism capable of adjusting a pre-tension degree of a spring. In this way, the support 300 of a same specification can be used to match the display screens 400 of different weights.

Second Embodiment

Figure 10:
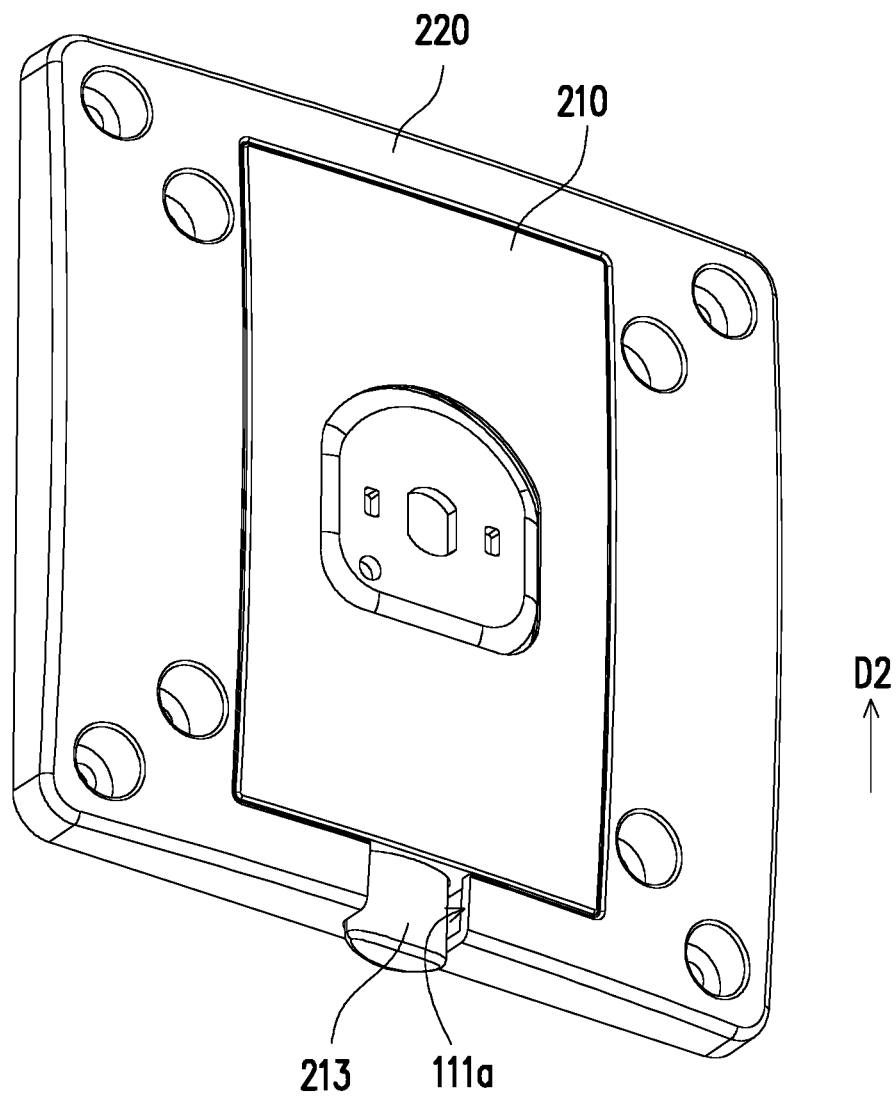
FIG. 10 is a schematic view of a combination of a quick release assembly according to a second embodiment of the invention.
Figure 11:
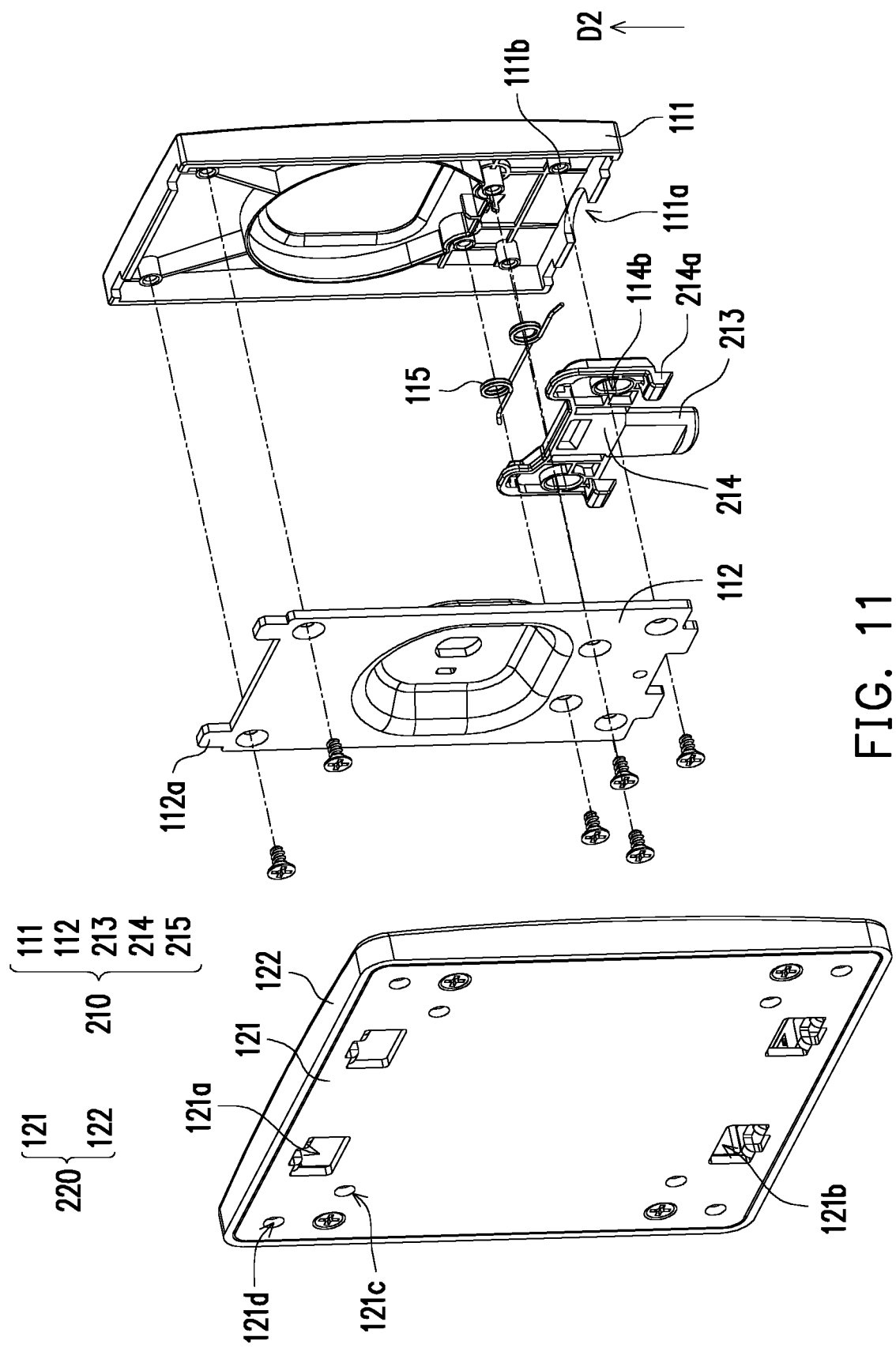
FIG. 11 is a schematic exploded view of the quick release assembly of FIG. 10.

FIG. 10 is a schematic view of a combination of a quick release assembly according to a second embodiment of the invention. FIG. 11 is a schematic exploded view of the quick release assembly of FIG. 10. With reference to FIG. 10 and FIG. 11, the present embodiment is similar to the first embodiment, between which a difference is that a button 213 and a driven-stop plate 214 in the present embodiment are integrally formed in structure, and a pressing direction of the button 213 is the same as a direction in which the driven-stop plate 214 moves.

It may be learned from FIG. 11 that the button 213 is located between two fixing hooks 214a, and the button 213 is exposed from below a first cover 111 and an engaging plate 112. An opening 111a is also located below.

To put it simply, because the button 213 and the driven-stop plate 214 are integrally formed in structure, when a second quick release unit 220 is to be removed from a first quick release unit 210, the button 213 only needs to be pushed in a second direction D2, and the driven-stop plate 214 that is integrally formed in structure with the button 213 is driven by the button 213 to moves in the second direction D2.

In addition, the spring 116 (of the embodiment) may further be omitted, and only an elastic restoring force of an elastic member 115 is needed to push the driven-stop plate 214 and the button 213 that are integrally formed in structure to move back to original positions.

In addition, because the button 213 and the driven-stop plate 214 are integrally formed in structure, an effect of a force applied to the button 213 is more direct, and a structure does not need to be used to change a transfer direction of the force, so that a user can use a relatively small force to release the second quick release unit 220 from the first quick release unit 210 for removal.

Assembling the display device to the support and movement of the quick release assembly are described in the first embodiment. Therefore, the descriptions thereof are omitted in the present embodiment.

Based on the above, the quick release assembly of the invention has an advantage of easy assembly and disassembly, and an operation manner is simple. In addition, the quick release assembly with at least one set of attachment holes can be applicable to display screens of different sizes or weights. Therefore, a support having the quick release assembly can also be applicable to the display screens of different sizes or weights, so that commonality of the support is improved, development and manufacturing costs are effectively reduced, or convenience for general consumers to remove and assemble is provided.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A quick release assembly configured to attach a display screen having at least one set of mounting holes to a support, wherein the quick release assembly comprises:
   a first quick release unit disposed on the support and comprising:
      a first cover comprising an opening;
      an engaging plate assembled to the first cover, wherein the engaging plate comprises at least one aligning hook;
      a button partially exposed from the opening;
      a driven-stop plate disposed between the first cover and the engaging plate and linked with the button, wherein the driven-stop plate comprises at least one fixing hook; and
      an elastic element with one end abutting against the driven-stop plate and the other end abutting against one of the first cover and the engaging plate; and
   a second quick release unit, comprising:
      a joint plate comprising at least one aligning hole, at least one fixing hole, and at least one set of attachment holes;
      a second cover assembled to the joint plate and comprising a notch; and
      a plurality of fixing members correspondingly inserted into the at least one set of attachment holes and the at least one set of mounting holes respectively, so as to secure the display screen to the joint plate,
      wherein the at least one aligning hook is correspondingly fit within the at least one aligning hole and the at least one fixing hook is correspondingly fit within the at least one fixing hole when the first quick release unit is engaged with the second quick release unit via the notch, so that the display screen is correspondingly attached to the support, and the driven-stop plate is driven when an external force is applied to press the button, causing the at least one fixing hook to be detached from the at least one fixing hole, so that the first quick release unit and the second quick release unit are separated from each other.

2. The quick release assembly according to claim 1, wherein the joint plate comprises at least one first wing protruding toward the second cover, and the at least one aligning hole is correspondingly formed on the at least one first wing.

3. The quick release assembly according to claim 2, wherein the joint plate comprises at least one second wing protruding toward the second cover, and the at least one fixing hole is correspondingly formed on the at least one second wing.

4. The quick release assembly according to claim 3, wherein the second cover comprises a recessed space corresponding to the notch, and the engaging plate is received in the recessed space and abuts against the joint plate when the first quick release unit is engaged with the second quick release unit.

5. The quick release assembly according to claim 4, wherein the second cover comprises a main plate, an external surrounding plate connected to the main plate, and an internal surrounding plate connected to the main plate, the notch is formed on the main plate, and the internal surrounding plate surrounds the notch and extends toward the joint plate, so that the recessed space is defined.

6. The quick release assembly according to claim 5, wherein at least one first fracture and at least one second fracture are formed on the internal surrounding plate, the at least one first wing is received in the at least one first fracture, and the at least one second wing is correspondingly received in the at least one second fracture.

7. The quick release assembly according to claim 1, wherein a number of sets of the at least one set of attachment holes is greater than or equal to two, and each set of attachment holes meet a specification defined by the VESA.

8. The quick release assembly according to claim 1, wherein the button comprises a sloped surface, the driven-stop plate comprises an inclined wall surface, and the slope surface is adapted to be in contact with the inclined wall surface.

9. The quick release assembly according to claim 8, wherein the first quick release unit further comprises a spring, the engaging plate comprises a first positioning column penetrating through the driven-stop plate, and the spring is sleeved on the first positioning column.

10. The quick release assembly according to claim 9, wherein the driven-stop plate comprises at least one sliding groove, the first cover comprises at least one second positioning column, and the at least one second positioning column correspondingly penetrates through the at least one sliding groove.

11. The quick release assembly according to claim 1, wherein the button and the driven-stop plate are integrally formed in structure.

12. A support capable of attaching a plurality of display screens comprising at least one set of mounting holes to the support, wherein the support comprises:
   a body;
   a quick release assembly comprising a first quick release unit and a second quick release unit, wherein the first quick release unit is attached to the body, the second quick release unit is attached to the display screen, and the first quick release unit comprises:
      a first cover comprising an opening;
      an engaging plate assembled to the first cover, wherein the engaging plate comprises at least one aligning hook;
      a button partially exposed from the opening;
      a driven-stop plate disposed between the first cover and the engaging plate and linked with the button, wherein the driven-stop plate comprises at least one fixing hook; and
      an elastic element with one end abutting against the driven-stop plate and the other end abutting against one of the first cover and the engaging plate; and
   the second quick release unit comprises:
      a joint plate comprising at least one aligning hole, at least one fixing hole, and at least one set of attachment holes;
      a second cover assembled to the joint plate and comprising a notch; and
      a plurality of fixing members correspondingly inserted into the at least one set of attachment holes and the at least one set of mounting holes respectively, so as to secure the display screen to the joint plate,
      wherein the at least one aligning hook is correspondingly fit within the at least one aligning hole and the at least one fixing hook is correspondingly fit within the at least one fixing hole when the first quick release unit is engaged with the second quick release unit via the notch, so that the display screen is correspondingly attached to the support, and the driven-stop plate is driven when an external force is applied to press the button, causing the at least one fixing hook to be detached from the at least one fixing hole, so that the first quick release unit and the second quick release unit are separated from each other.

13. The support according to claim 12, wherein the body is a stand body.

14. The support according to claim 13, wherein the body comprises:
a base; and
an upright vertically disposed on the base, wherein the upright comprises an attachment end, and the first quick release unit is attached to the attachment end.

15. The support according to claim 14, wherein a quantity of sets of the at least one set of attachment holes is greater than or equal to two, and each set of attachment holes meet a specification defined by the VESA.

16. The support according to claim 12, wherein the body is an arm body.

17. The support according to claim 12, wherein the joint plate comprises at least one first wing protruding toward the second cover, and the at least one aligning hole is correspondingly formed on the at least one first wing.

18. The support according to claim 17, wherein the joint plate comprises at least one second wing protruding toward the second cover, and the at least one fixing hole is correspondingly formed on the at least one second wing.

19. The support according to claim 18, wherein the second cover comprises a recessed space corresponding to the notch, and the engaging plate is received in the recessed space and abuts against the joint plate when the first quick release unit is engaged with the second quick release unit.

20. The support according to claim 19, wherein the second cover comprises a main plate, an external surrounding plate connected to the main plate, and an internal surrounding plate connected to the main plate, the notch is formed on the main plate, and the internal surrounding plate surrounds the notch and extends toward the joint plate, so that the recessed space is defined.

21. The support according to claim 20, wherein at least one first fracture and at least one second fracture are formed on the internal surrounding plate, the at least one first wing is received in the at least one first fracture, and the at least one second wing is correspondingly received in the at least one second fracture.

22. The support according to claim 12, wherein the button comprises a sloped surface, the driven-stop plate comprises an inclined wall surface, and the sloped surface is adapted to be in contact with the inclined wall surface.

23. The support according to claim 22, wherein the first quick release unit further comprises a spring, the engaging plate comprises a first positioning column penetrating through the driven-stop plate, and the spring is sleeved on the first positioning column.

24. The support according to claim 12, wherein the driven-stop plate comprises at least one sliding groove, the first cover comprises at least one second positioning column, and the at least one second positioning column correspondingly penetrates through the at least one sliding groove.

25. The support according to claim 12, wherein the button and the driven-stop plate are integrally formed in structure.

* * * * *